3,489,694
METHOD OF STABILIZING AND INCREASING THE ACTIVITY OF RANEY CATALYSTS, PARTICULARLY RANEY NICKEL
Erhard Weidlich and Gerlind Kohlmuller, Erlangen, Germany, assignors to Siemens Aktiengesellschaft, a corporation of Germany
Filed Feb. 8, 1968, Ser. No. 704,030
Claims priority, application Germany, Feb. 9, 1967, S 108,229
Int. Cl. B01j *11/06*
U.S. Cl. 252—477                                          6 Claims

ABSTRACT OF THE DISCLOSURE

Described is a method of stabilizing and increasing the activity of Raney catalysts, particularly Raney nickel. The method comprises treating the Raney catalysts with aqueous hydrochloric acid or hydrochloric acid containing ferric chloride, followed by alkali elimination of the inactive component.

---

The present invention relates to a method of stabilizing and increasing the activity of Raney catalysts, particularly of Raney nickel.

Raney catalysts are used for the catalytic hydrating and dehydrating of organic compounds. Recently they have become very important in reaction of hydrogen and hydrocarbon in electrochemical fuel elements.

It is known that Raney catalysts are produced by dissolution of inactive components from a Raney alloy, for example aluminum from a nickel-aluminum alloy, by alkali solutions or acids. The nobler metal is thereby precipitated as a fine grained microporous powder with large surface. During this process a great number of holes simultaneously forms in the metal lattice of the nickel which renders the latter exceptionally active and well qualified for binding, either chemically or physically, the hydrogen resulting from the dissolution of the nobler metal. It is also known that Raney catalysts, which are stored, hydrated or used for longer periods in electrodes of electrochemical fuel elements, decrease in activity and after a time become useless.

It is an object of our invention to devise a method of processing Raney catalysts whereby the aforementioned loss of activity is eliminated.

We accomplish the stabilization and increase in activity of Raney catalysts, particularly in Raney nickel, by treating the catalysts with aqueous hydrochloric acid or with hydrochloric acid containing ferric chloride, $FeCl_3$, and thereafter eliminating the inactive component by dissolving out, using an alkali liquor.

These results were particularly surprising in view of the fact that subsequent treatment of the Raney alloy with hydrochloric acid showed neither an increase in stability nor in activity. We suspect that the decline of activity which occurs in Raney catalysts is caused by a partial oxidation of the Raney metal, for example the oxidation of nickel into nickel oxide or hydroxide. By developing a passive surface layer, the highly active surface of the Raney metal is being blocked.

During the alkali aftertreatment of the Raney metal, activated with hydrochloric acid or with hydrochloric acid containing ferric chloride, the surface of the Raney metal is etched with simultaneous dissolving out of any hydroxides or oxides present. Concomitant with the above, an adsorption of iron occurs at the surface.

Figure 1:
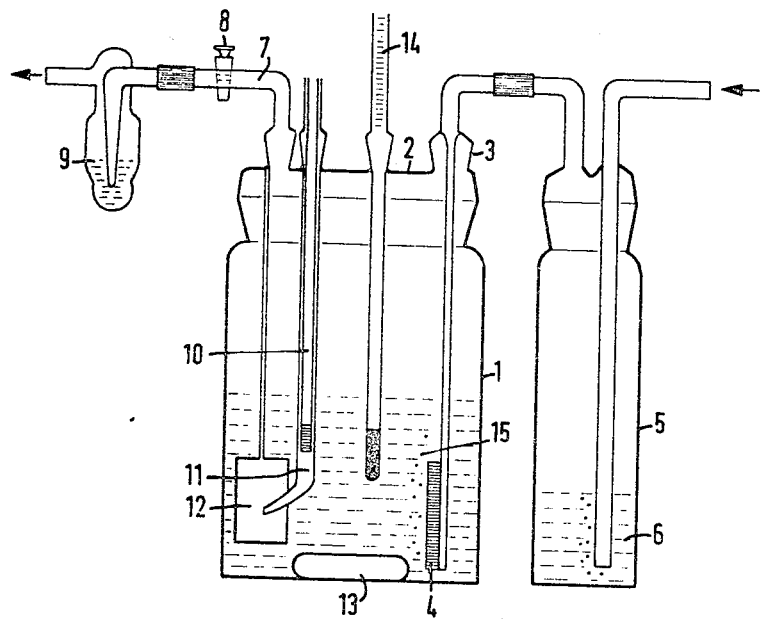
Figure 2:
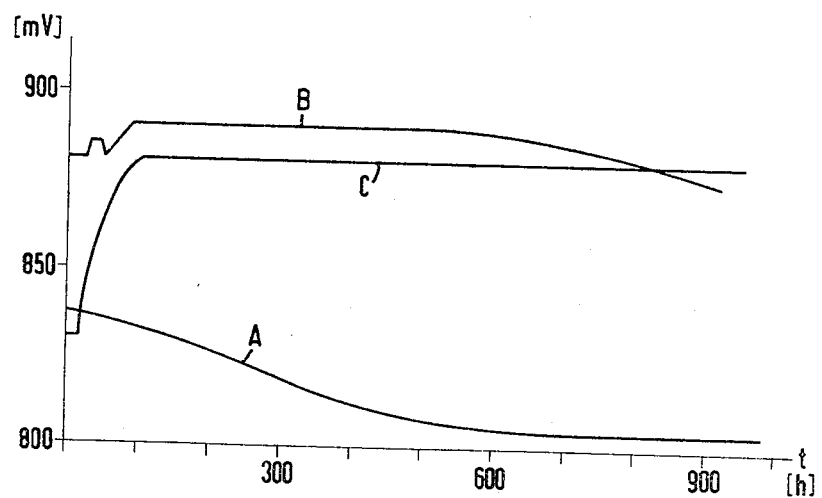

In the drawings:
FIG. 1 shows apparatus for carrying out our method; and
FIG. 2 shows the results of said method.

The treatment of the Raney nickel may be effected, in accordance with our invention, for example, by suspending the catalyst in water in the apparatus of FIG. 1 using magnetic agitation, after activation of the catalyst with 6 N KOH and rinsing with distilled water to a pH of about 7. The dilute aqueous hydrochloric acid or the ferric chloride containing hydrochloric acid was then added and left standing, under vigorous agitation, for about 15 min., at room temperature. The end point of the reaction is preferably determined by following the potential curve at the platinum electrode until it remains at a constant value. Following decantation or suctioning off of liquid, the thus preprocessed catalyst is washed with water to neutrality.

FIG. 1 shows a glass vessel 1 which serves for receiving the catalyst and which is hermetically sealed with a cover 2. An inert gas, for example nitrogen, after passing through washing bottle 5, is introduced into the vessel 1 via tube 3, in the cover 2, through fritted glass 4. The washing liquid 6 may be potassium hydroxide. The inert gas leaves the reaction vessel 1 through the gas pipe 7 which contains the two-way valve 8 and the bubble counter 9. In this figure, 10 denotes the reference electrode, equipped with a Luggin capillary 11 while 12 denotes the platinum electrode used for measuring the potential. The magnetic agitator is 13 while 14 is a thermometer. The hydrochloric acid solution, containing the catalyst to be treated, is indicated as 15.

The HCl solution is at most 0.5 molar but is preferably 0.1 to 0.3 molar. The concentration of $FeCl_3$ should at a maximum be 0.6 H atoms/Ni atom and preferably 0.1 to 0.3 H atoms/Ni atom.

The catalyst thus produced is still somewhat pyrophoric. Compared to Raney catalysts produced by the known methods, it has an excellent activity. The pyrophoric properties may be eliminated in a simple manner, e.g. by bringing the thoroughly washed catalyst into contact with air, for a prolonged period. This feature helps to remove any reactive hydrogen still within the nickel catalyst. Of course, the pyrophorosity of the new catalyst may also be eliminated by a subsequent anodic oxidation.

The catalyst, after having undergone this type of aftertreatment, may be stored for a long time in a dry state in the air, without suffering a loss in activity.

In FIG. 2, curve A shows the potential of a Raney-nickel electrode as measured against an Hg/HgO electrode, plotted with time as the abscissa. For comparison purposes, curve B shows the potential of an electrode, comprised of Raney nickel, which had been treated for 15 minutes, at room temperature, with 0.3 N of aqueous hydrochloric acid, while curve C shows the potential of a Raney nickel electrode which had been pretreated with hydrochloric acid containing ferric chloride. As shown in FIG. 2, the best results were obtained with the sample pretreated with hydrochloric acid and ferric chloride solution, during protracted tests, at an anodic charge of 30 ma./cm.$^2$. The Raney nickel used for plotting curve C was produced as follows:

20 g. Raney nickel (50 Ni:50 Al) with a grain size of approximately 50$\mu$ were portionwise added to 6 N KOH, until hydrogen formation ceased. After an exchange of lye, the activating process was continued at 90° C. for 2 hours. The lye was now decanted off and the catalyst was washed to neutrality, that is to a pH of 7. The washed catalyst was then treated, under agitation, for 15 minutes, at room temperature, with 10 cc. of 0.1 normal hydrochloric acid, in which 4.6 g. $FeCl_3 \cdot 6H_2O$ had been dissolved. Subsequently, the catalyst was thoroughly rewashed and pressed between two nickel nets. The potential curve of the thus produced electrode was plotted in a half-cell device, at room temperature, with a galvanostatic load of 30 ma./cm.² An asbestos layer was used thereby as an electrolyte carrier and 6 N KOH were used as the electrolyte. The hydrogen pressure of the Raney-nickel electrode amounted to 1.40 atm.

The aftertreatment of the Raney catalyst of the present invention was conducted in the above examples at room temperature. However, the stabilization and activation may also be carried out at temperatures up to 100° C. The activation period may be shortened by an increase in temperature, but should last at least for 5 minutes.

We claim:

1. Method of stabilizing and increasing the activity of Raney catalysts, particularly Raney nickel, which comprises treating the Raney alloys with aqueous hydrochloric acid or hydrochloric acid containing ferric chloride, and thereafter leaching out the inactive component.

2. The method of claim 1, wherein the aqueous hydrochloric acid is 0.5 molar.

3. The method of claim 1, wherein from 0.1 to 0.3 molar aqueous hydrochloric acid is used.

4. The method of claim 1, wherein the concentration of ferric chloride solution is the amount necessary to give 0.6 H atom/Ni atom and 0.1 to 0.3 H atom/Ni atom.

5. The method of claim 1, wherein the treatment is effected in an inert gas atmosphere.

6. The method of claim 1, wherein the treatment using aqueous ferric chloride containing hydrochloric acid is carried out for at least 5 minutes.

No references cited.

DANIEL E. WYMAN, Primary Examiner

PHILIP M. FRENCH, Assistant Examiner

U.S. Cl. X.R.

252—441, 442, 472